United States Patent [19]
Wilson

[11] Patent Number: 5,396,919
[45] Date of Patent: Mar. 14, 1995

[54] ROTATING DISC VALVE
[75] Inventor: James T. Wilson, Summit, N.J.
[73] Assignee: Everlasting Valve Co., Inc., South Plainfield, N.J.
[21] Appl. No.: 108,921
[22] Filed: Aug. 18, 1993
[51] Int. Cl.6 .......................................... F16K 29/00
[52] U.S. Cl. ................................. 137/330; 251/327; 251/328
[58] Field of Search ............... 137/243, 243.2, 330; 51/241 A, 241 VS; 251/193, 195, 203, 326, 327, 328

[56] References Cited

U.S. PATENT DOCUMENTS

| | | | |
|---|---|---|---|
| 2,443,929 | 6/1948 | Patterson | 137/243.2 |
| 2,964,291 | 12/1960 | Williams et al. | 251/327 |
| 3,047,266 | 8/1962 | Ver Nooy | 251/175 |
| 3,305,208 | 2/1967 | Bredtschneider | 251/327 |
| 3,318,568 | 5/1967 | Blomstran | 251/259 |
| 3,400,441 | 9/1968 | Fryling | 251/327 |
| 3,478,771 | 11/1969 | Johnson | 251/327 |
| 3,506,238 | 4/1970 | Bertels | 251/193 |
| 3,837,356 | 9/1974 | Selep et al. | 137/375 |
| 4,174,728 | 11/1979 | Usnick et al. | 137/240 |
| 4,187,876 | 2/1980 | Lang | 137/594 |
| 4,221,307 | 9/1980 | Peterson | 251/327 |
| 4,335,733 | 6/1982 | Richards | 137/1 |
| 4,367,766 | 1/1983 | Uomala | 137/243 |
| 4,373,546 | 2/1983 | Krakovsky | 137/330 |
| 4,381,100 | 4/1983 | Schoenberg | 251/175 |
| 4,383,546 | 5/1983 | Walters, Jr. | 137/240 |
| 4,412,671 | 11/1983 | Tiefenthaler | 251/31 |
| 4,429,710 | 2/1984 | Grieves et al. | 137/375 |
| 4,449,547 | 5/1984 | Krakovsky | 137/330 |
| 4,509,549 | 4/1985 | Cooper et al. | 137/327 |
| 4,585,023 | 4/1986 | Almada | 137/240 |
| 4,787,417 | 11/1988 | Windsor, Jr. | 137/624.13 |
| 4,881,717 | 11/1989 | Geiser | 251/144 |
| 4,949,939 | 8/1990 | Almada | 251/328 |
| 5,024,416 | 6/1991 | Cohen | 251/78 |

OTHER PUBLICATIONS

Everlasting Rotating Disc Valves, 4 page sales brochure.
"An 86 Year Old Workaholic" 2 page sales brochure.

Primary Examiner—George L. Walton
Attorney, Agent, or Firm—Lerner, David, Littenberg, Krumholz & Mentlik

[57] ABSTRACT

A disc valve is linearly actuated to effect rotation of its sealing disc during opening and closing operations. Disc rotation is effected by creating unbalanced frictional forces between the sealing surfaces during valve operation. Rotation of the disc produces a lapping action that in the process medium renews and polishes the metal seating surfaces with each operation.

24 Claims, 5 Drawing Sheets

ROTATING DISC VALVE

BACKGROUND OF THE INVENTION

The present invention relates in general to the control of material flow through an opening by means of a moveable sealing disc, and more particularly, to a linearly actuated valve of the pseudo-gate type having a sealing disc rotatable during use to affect uniform distribution of wear over its sealing surfaces thereby substantially increasing its useful life. Still more particularly, the present invention relates to valves of the sliding-gate or disc type which are especially well suited for controlling the flow of highly abrasive materials such as slurries and the like.

It is well known in the material handling art to employ sliding-gate or disc type valves for the purpose of controlling material flow. A conventional moveable gate or disc will reciprocate between an open position allowing material flow to a closed position wherein the gate or disc moves against a valve seat to close off material flow. In the course of normal use, the valve seat typically becomes eroded, worn and/or corroded as a result of this continued action.

Various attempts have been made to improve this valve operation by overcoming or avoiding the deterioration of the valve seat. It has been proposed to provide removable valve seats which may be replaced without replacing the entire valve, such as known from Grieves, et al., U.S. Pat. No. 4,429,710. Other attempts have included the use of movable valve seat protectors which selectively cover the valve seats, such as known from Almada, U.S. Pat. No. 4,949,939. In all, these gate valves have been found to be unsatisfactory, in that breakdown or removal of the valve seat often still requires replacement of the entire valve.

In an effort to overcome the adverse effects of valve seat wear, there is known the various designs of a rotating disc valve. In this regard, the sealing discs are arranged for limited rotation about their supporting shafts during each opening and closing cycle of the valve. One such rotating disc valve is available from Everlasting Valve Company, Inc. of South Plainfield, N.J., the assignee of the present invention. In operation, an actuator moves a valve stem and lever arm a quarter turn, which drives a sliding sealing disc. The entire sealing surface of the disc is constantly in contact with the valve seat through force exerted by coiled springs which allow the disc to move vertically. This compensates for thermal expansion and contraction of the valve's components, also overcoming the effect of any backpressure for which it was designed and prevents particles from lodging between the sealing surfaces. Differences in tangential disc to seat friction forces causes the disc to rotate on its seat as the valve cycles, thereby shearing and wiping away any processed materials it may have accumulated. Rotation of the disc produces an action that in the process medium renews and polishes the metal seating surfaces with each operation. Rotating disc valves of this general type are also known from Krakovsky, U.S. Pat. No. 4,373,546.

In the Krakovsky and Everlasting rotating disc valve, the disc is moved along a curved path by the pivotal operation of the actuator and lever arm. This pivotal arrangement has necessitated an undesirable size configuration of the valve housing to accommodate the extent and location required for the valve actuator operation. It has been found that this design in certain applications, for example steam isolation valves, will not meet the size requirements of an economically and technically competitive cast valve body. To this end, there is known from Uomala, U.S. Pat. No. 4,367,766 and Krakovsky, U.S. Pat. No. 4,449,547, a linearly actuated disc valve which employs a straight line motion of the sealing discs. Uomala discloses a gate valve having a linearly actuated valve spindle supporting a T-joint. Rotatably mounted on either face of the T-joint is a circular sealing disc journaled by means of a ball. A pair of flexible pins are arranged extending from within a cover of the valve housing. As the valve spindle raises the sealing discs, the pins circumferentially engage the sealing discs to cause limited rotation thereof.

In Krakovsky, a similar gate valve having a pair of sealing discs mounted for rotation on respective bearings are moved by means of the linear movement of a valve spindle. The size of the fluid inlet opening is greater than the size of the outlet opening in order to create a variable fluid flow through the valve which is affected primarily by the position of the sealing disc relative to the outlet opening. The outlet opening may be symmetrical in shape or otherwise asymmetrically located relative to the closure path of the center of the disc. Fluid flow through the valve produces a rotational torque on the sealing disc about the center of its bearing to rotate the disc whenever the friction between the disc and its seat is not significantly great from the wedging action during closing of the valve.

These aforementioned valves although providing for linear actuation of a rotatable disc are less than desirable in design and suffer from a number of notable disadvantages. For example, the Krakovsky valve enables only the rotation of one of the two discs during operation, in addition to requiring an undesirable diverted flow path through the valve housing. As to Uomala, the pins are only effective upon complete opening of the valves thereby limiting their utility during valve throttling operations. In addition, the pins are relatively inaccessible requiring disassembly of the valve housing in the event of their breakage.

Accordingly, it can be appreciated that there is an unsolved need for a linearly actuated rotating disc valve which overcomes and avoids the disadvantages and deficiencies of the aforementioned known rotating disc valves.

SUMMARY OF THE INVENTION

It is broadly an object of the present invention to provide a linearly actuated rotating disc valve which provides uniform distribution of wear over its sealing surfaces so as to substantially increase its useful life.

Another object of the present invention is to provide a linearly actuated rotating disc valve whose housing is constructed to occupy a minimum of space in accommodating the mechanism for effecting linear actuation.

Another object of the present invention is to provide a rotating disc valve using straight line motion which allows the valve housing to be designed as a one piece casting, along with the reduction of internal drive components.

In accordance with one embodiment of the present invention there is provided a valve comprising a housing having an opening for the flow of material therethrough, drive means within the housing for movement relative to the opening along an axis between open and closed positions, sealing means rotatably mounted to the drive means for closing the opening when the drive means is in the closed position, the drive means engaging the sealing means during movement thereof at a location offset from the axis whereby rotation of the sealing means is effected.

In accordance with another embodiment of the present invention there is provided a valve comprising a housing having an opening for the flow of material therethrough, a disc drive within the housing reciprocal relative to the opening along a linear axis between open and closed positions, a sealing disc rotatably mounted to the disc drive for closing the opening upon contact with a portion of the housing surrounding the opening when the disc drive is in the closed position, the disc drive engaging the sealing disc during reciprocal movement thereof at a location offset from the linear axis, whereby the sealing disc rotates during reciprocal movement thereof by the disc drive.

In accordance with another embodiment of the present invention there is provided a valve comprising a housing having an opening surrounded by a sealing seat for the flow of material therethrough, a disc drive within the housing reciprocal relative to the opening along a linear axis between open and closed positions, the disc drive comprising a generally parallelogram shaped body, a sealing disc having a sealing surface on one side thereof for sealing engagement with the sealing seat and a bearing extending from another side thereof for rotationally receiving therein the body of the disc drive, the body engaging the sealing disc at a first location when moved in a first direction and at a second location when moved in a second direction opposite the first direction, the first and second locations being offset from the linear axis whereby the sealing disc rotates during reciprocal movement thereof by the disc drive.

In accordance with another embodiment of the present invention there is provided a valve comprising a housing having an opening for the flow of material therethrough, drive means within the housing for movement relative to the opening along a linear axis between open and closed positions, sealing means having a rotational axis rotatably mounted to the drive means for closing the opening when the drive means is in the closed position, the drive means engaging the sealing means during movement thereof at an eccentric location to the rotational axis thereof whereby rotation of the sealing means is effected.

In accordance with another embodiment of the present invention there is provided a valve comprising a housing having an opening for the flow of material therethrough, drive means within the housing for movement relative to the opening along an axis between open and closed positions, sealing means having a rotational axis rotatably mounted to the drive means for closing the opening when the drive means is in the closed position, the sealing means having a sealing area whose centroid is eccentric to the rotation axis of the sealing means, whereby rotation of the sealing means is effected during movement thereof by the drive means.

BRIEF DESCRIPTION OF THE DRAWINGS

The above description, as well as further objects, features and advantages of the present invention will be more fully understood with reference to the following detailed description of a rotating disc valve, when taken in conjunction with the accompanying drawings, wherein.

DETAILED DESCRIPTION OF THE PREFERRED EMBODIMENTS

Figure 1:
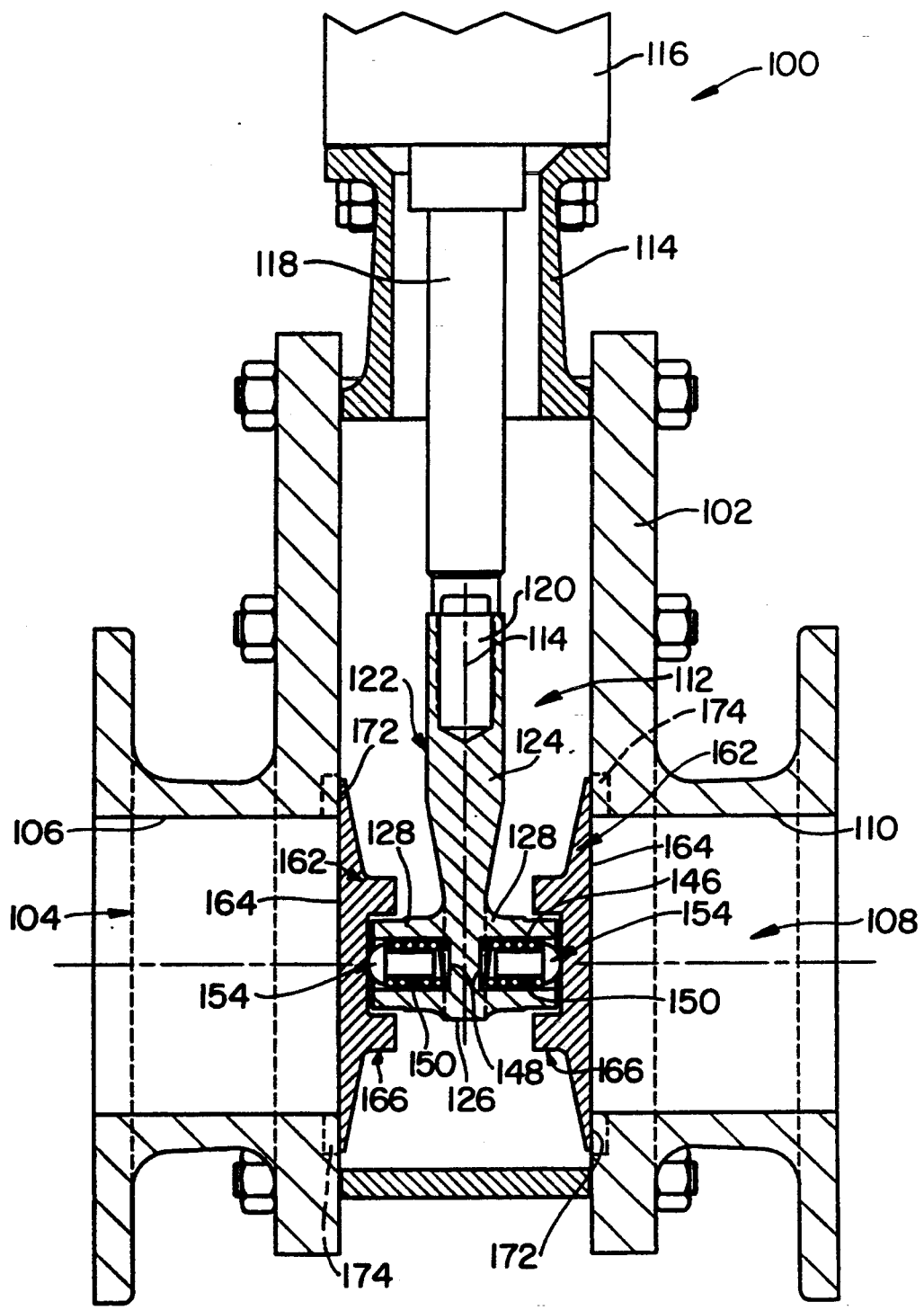
FIG. 1 is a partial cross-sectional view of a linearly actuated rotating disc valve constructed in accordance with one embodiment of the present invention and adapted for operation using an air cylinder.

Referring now to the drawings wherein like reference numerals represent like elements, there is illustrated in FIG. 1 a linearly actuated rotating disc valve designated generally by reference numeral 100. The rotating disc valve 100 is constructed of a hollow housing 102 having an inlet 104 defined by a tubular passageway 106, a fluid outlet 108 defined by a tubular passageway 110 and a central cavity 112 therebetween. A hollow extension 114 is provided at one end of the cavity 112 for supporting an air cylinder 116 having a valve stem 118 connected thereto.

Figure 2:
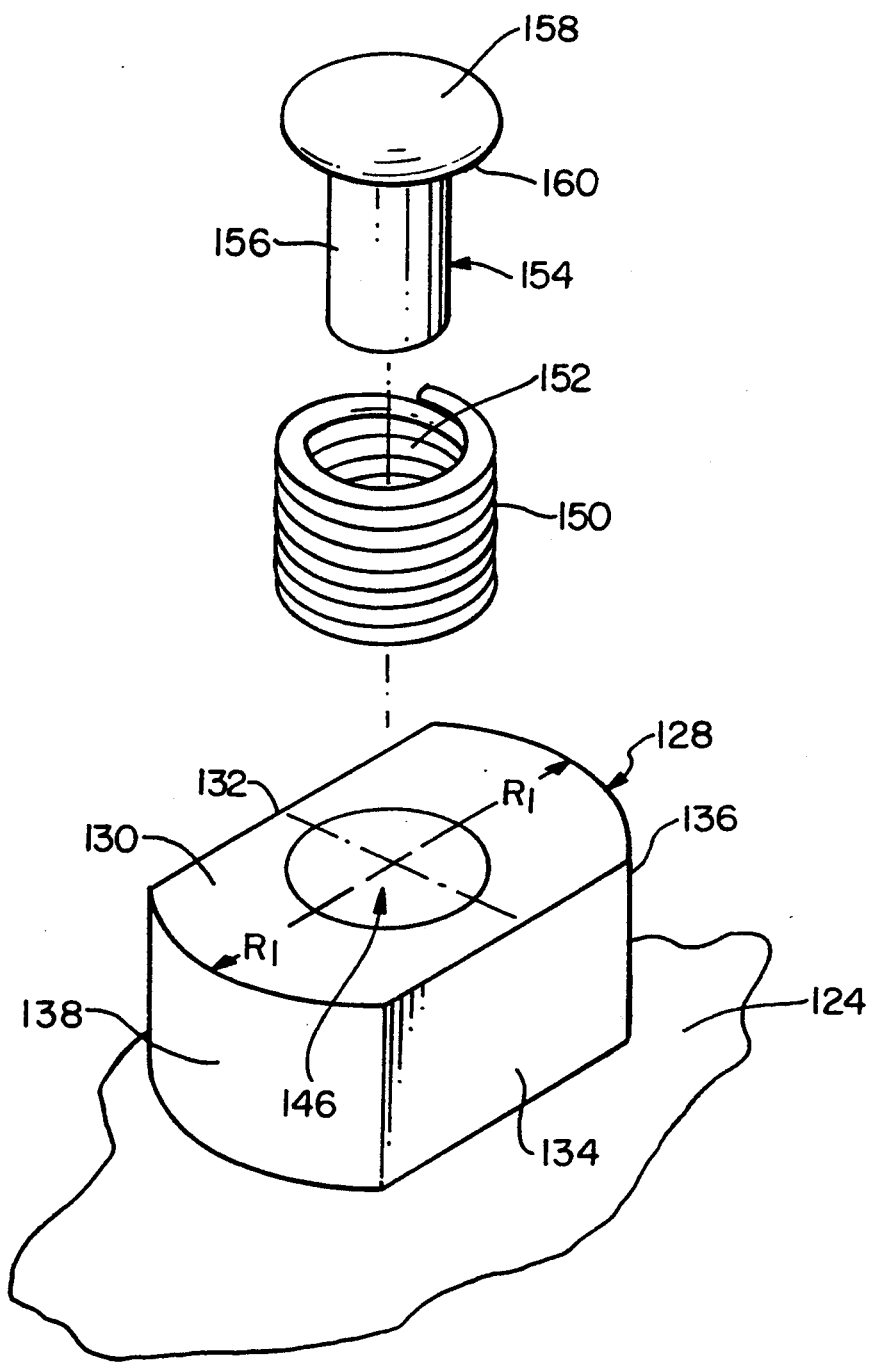
FIG. 2 is an exploded perspective view of a disc drive assembly to which a sealing disc is rotatably mounted.
Figure 3:
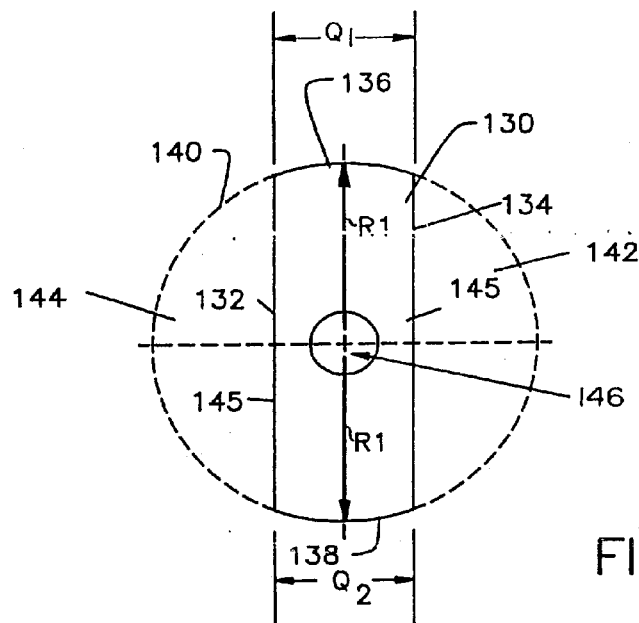
FIG. 3 is a top plan view of the drive hub of the disc drive assembly.

Attached to the valve stem 118 by means of threads 120 is a disc drive assembly 122. The disc drive assembly 122 arranged within cavity 112 is constructed from a shaft 124 supporting adjacent its distal end 126 a pair of opposed drive hubs 128. As best shown in FIGS. 2 and 3, each drive hub 128 in accordance with the preferred embodiment is constructed from a projecting body 130 generally in the form of a parallelogram having a pair of parallel spaced flat sidewalls 132, 134 and a pair of curved endwalls 136, 138 of uniform radius. The drive hub 128 is constructed from an imaginary cylindrical body 140 of radius $R_1$ having circumferential portions which define the curved endwalls 136, 138 along respective arcs $\theta_1$, $\theta_2$. The flat sidewalls 132, 134 are formed by removing opposing chord segments 142, 144 from the remaining cylindrical body 140. In accordance with the preferred embodiment, the arcs $\theta_1$, $\theta_2$ are substantially equal, for example about 60°, such that the drive hub 128 is symmetrical about its center axis. However, it is contemplated that arcs $\theta_1$, $\theta_2$ may be other than equal as will become apparent from the operation of the rotating disc valve 100 in accordance with another embodiment of the present invention as to be described.

A cylindrical bore 146 is centrally provided within the drive hub 128 extending to an endwall 148 as shown in FIG. 1. The bore 146 is sized to receive a coiled compression spring 150 having a central opening 152. The disc drive assembly 122 is completed by a bearing pin 154 constructed from a cylindrical shaft 156 supporting a semi-spherical member 158 forming a shoulder 160. The shaft 156 of the bearing pin 154 is sized to be received within the central opening 152 of the spring 150. On the other hand, the semi-spherical member 158 is sized to be received only within the bore 146 of the disc hub 128 in order to be supported by the spring 150 upon shoulder 160.

Figure 4:
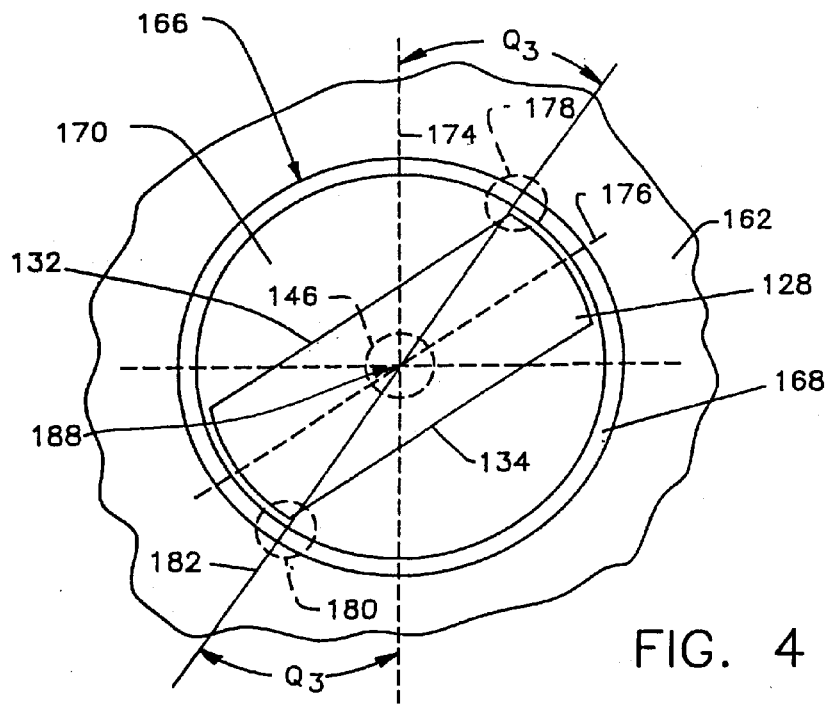
FIG. 4 shows the operative relationship between the drive hub of the disc drive assembly and a bearing of the sealing disc to effect disc rotation.
Figure 5:
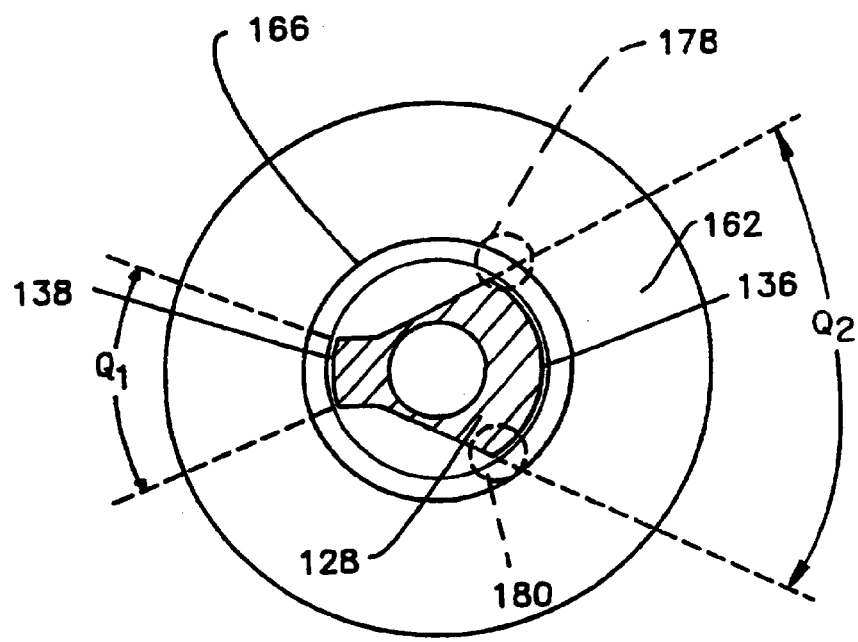
Figure 6:
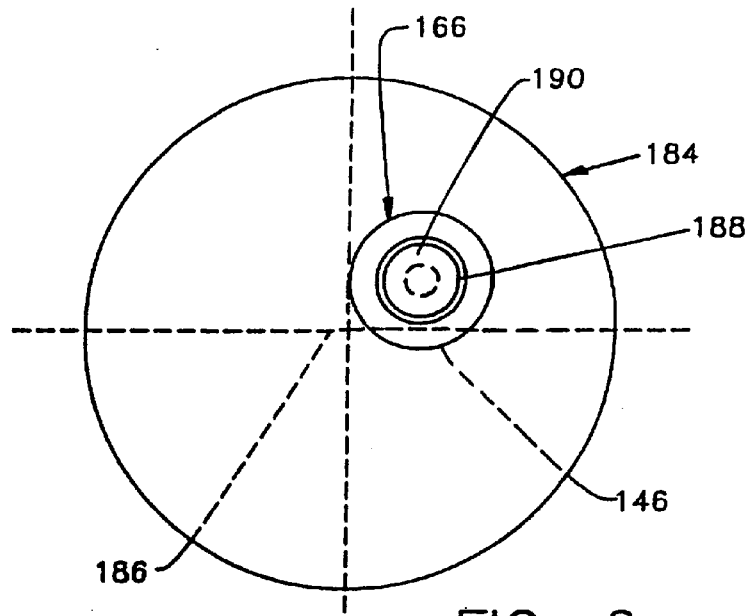
Figure 7:
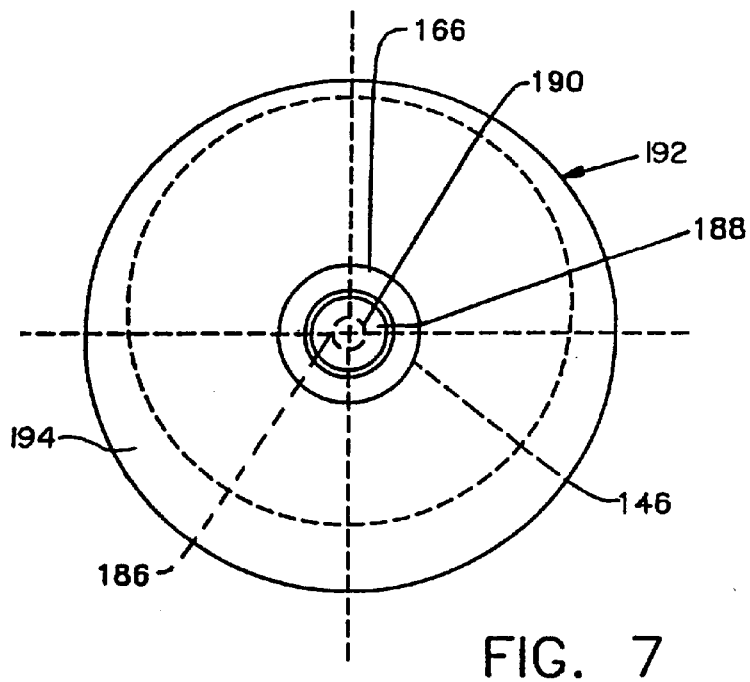
Figure 8:
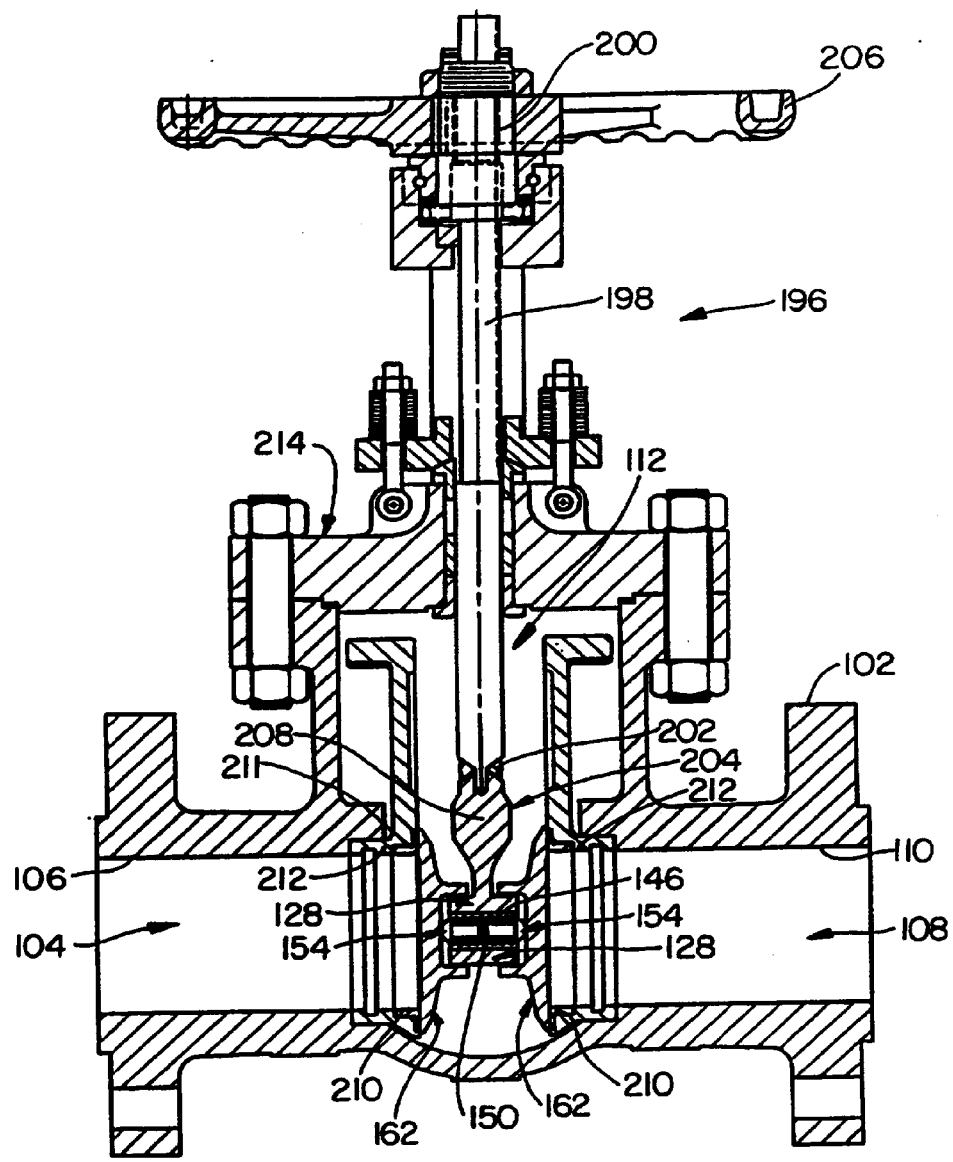
Figure 1:
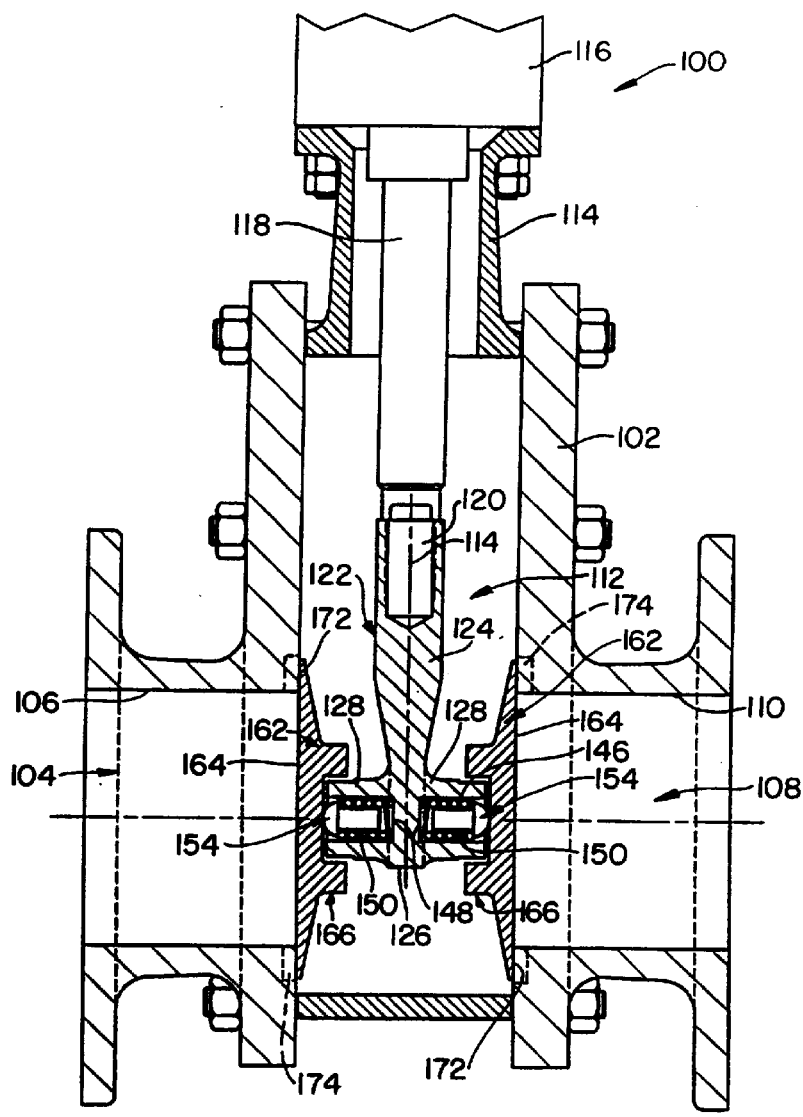
Figure 2:
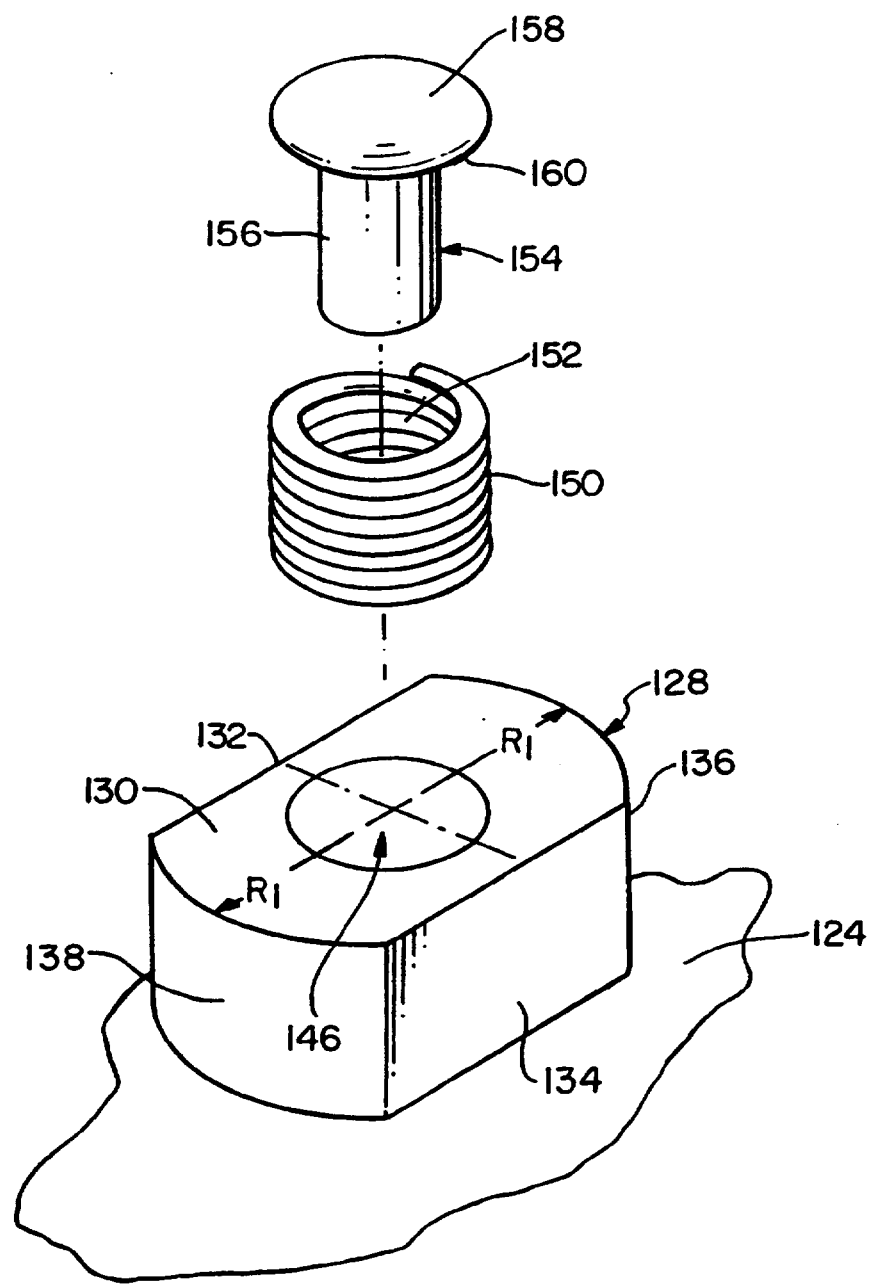
Figure 3:
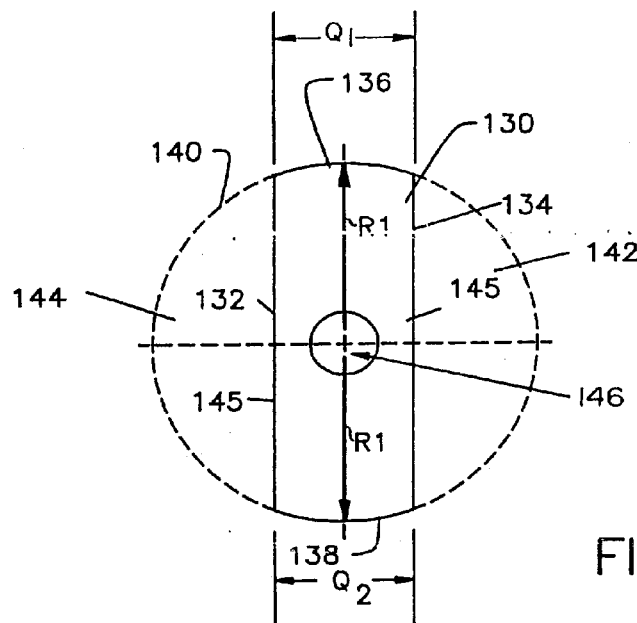
Figure 4:
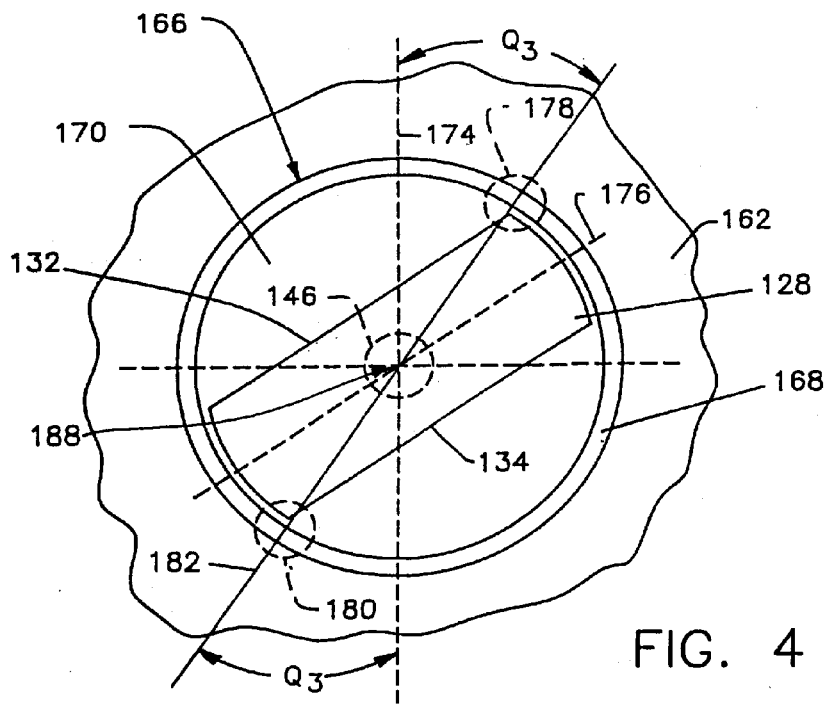
Figure 5:
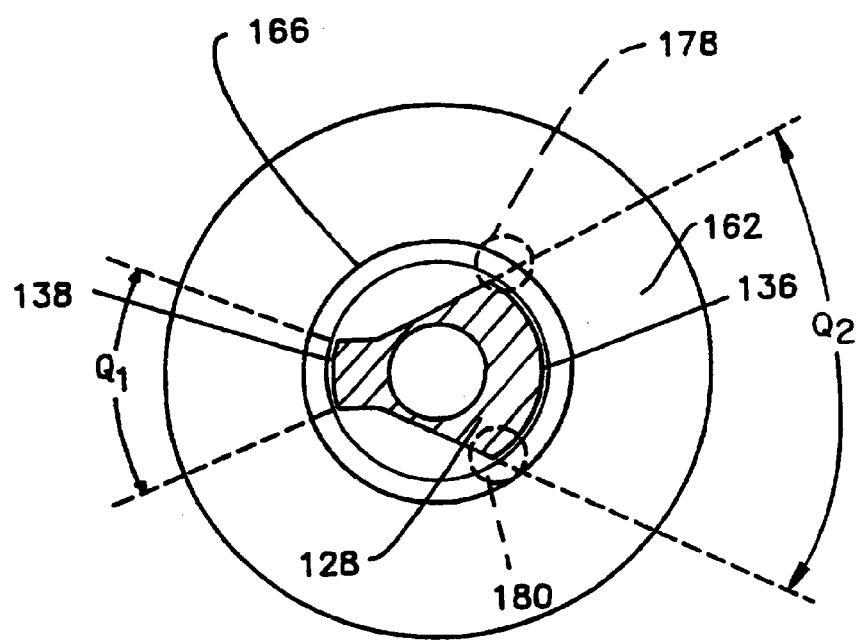
Figure 6:
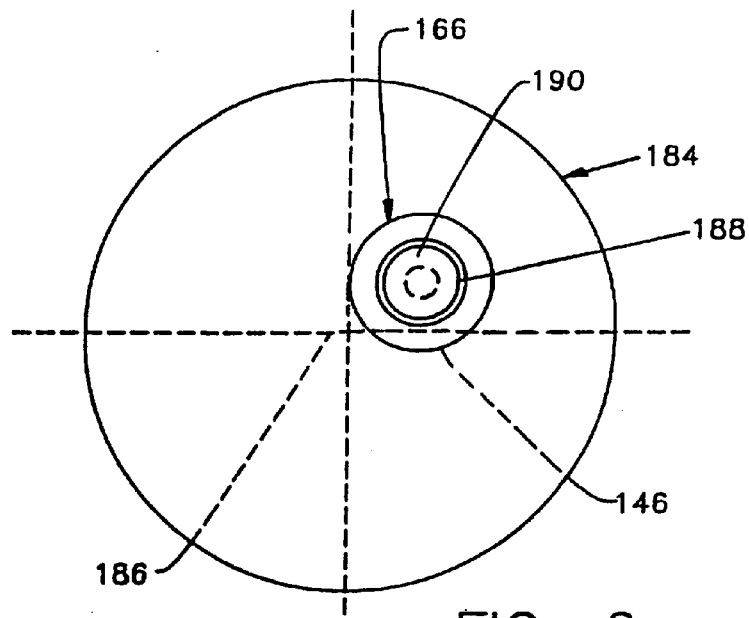
Figure 7:
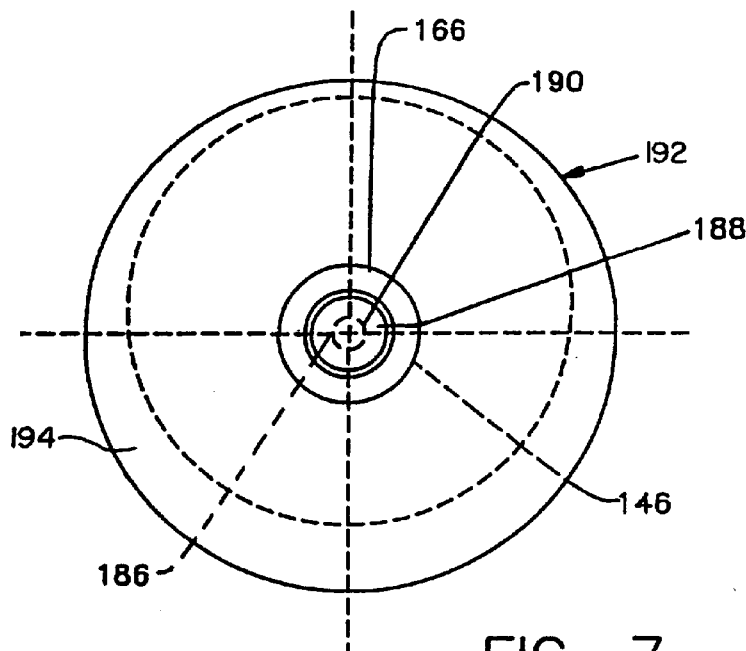
Figure 8:
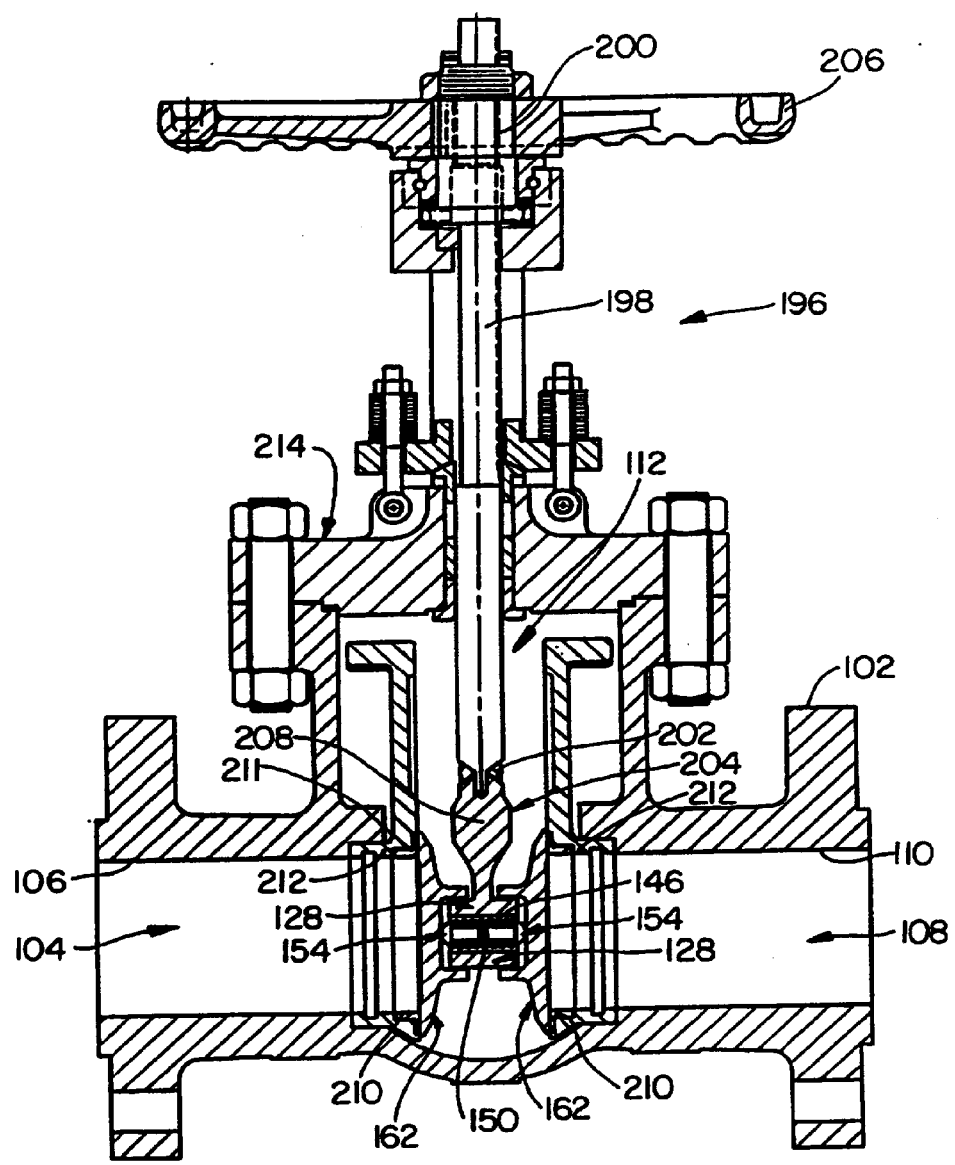

A pair of circular sealing discs 162 having a planar sealing surface 164 on one side and a protruding bearing 166 on the other side are rotationally mounted about the drive hubs 128. In particular, each bearing 166 is constructed from a cylindrical wall 168 defining a circular bore 170. As best shown in FIG. 4, the bore 170 is sized to have a radius slightly greater than $R_1$ so as to freely rotationally receive the drive hub 128.

Referring again to FIG. 1, the disc drive assembly 122 and sealing discs 162 are shown in operative assembled relationship to prohibit fluid flow between the inlet 104 and outlet 108. In this regard, a circumferential portion of the sealing surfaces 164 of the discs 162 are compressed against a circumferential portion of the housing 102 forming a valve seat 172 circumscribing passageways 106, 110 which form the inlet 104 and outlet 108. The continuous compressive sealing force is maintained by action of the spring 150 which is compressively captured between the endwall 148 of the drive hub 128 and shoulder 160 of the bearing pin 154. The semi-spherical member 158 of the bearing pin 154 accordingly acts to transmit the compressive force of the spring 150, as well as acting as a bearing surface for rotation of the sealing discs 162 about drive hub 128. The valve seats 172 although described as a portion of the housing 102, may be formed as pressed in inserts 174, as shown in phantom, constructed of hard material such as stainless steel and the like.

The components of the rotating disc valve 100 can be constructed from a variety of materials. For example, the housing 102 can be constructed from cast iron or carbon steel, particularly when the valve seats 172 are constructed as stainless steel inserts. The sealing discs 162 and disc drive assembly 122 can be constructed from cast iron or stainless steel 440 C. The bearing pins 154 can be constructed from carbon steel, while the valve stem 118 can be constructed from plated carbon steel and the like.

The operation of the rotating disc valve 100 to achieve rotation of the sealing discs 162 during use to effect uniform distribution of wear over their sealing surfaces 164 and valve seat 172 and valve seat 172 so as to thereby substantially increase their useful life will now be described with respect to FIG. 4. The path of reciprocal movement of the drive hub 128 by means of the valve stem 118 via cylinder 116 is along a linear axis 174 which bisects the cavity 112 within the housing 102. The drive hub 128 is fixedly oriented via shaft 124 such that its longitudinal axis 176 is at an angle to the linear axis 174. As a result of this relationship, the general contact areas 178, 180 (as shown in dashed circles) between the drive hub 128 and the wall 168 of the bearing 166 are offset from the linear axis 174 by an arc $\theta_3$.

As the sealing disc 162 travels downwardly via movement of drive hub 128 along the linear axis 174, i.e., in a valve closing direction, contact area 180 engages wall 168 whereby all of the friction forces act through the disc center 182. This causes the sealing disc 162 to rotate in trying to realign itself so that its disc center 182 is aligned vertically with the contact area 180 along an imaginary vertical line designated 184. As a result of the foregoing operation of the rotating disc valve 100, the sealing disc 162 will rotate in a counterclockwise direction about the drive hub 128. Similarly, because the aforementioned arrangement is symmetric, i.e., $\theta_1$ is equal to $\theta_2$, but opposite, the sealing disc 162 will also rotate in a counterclockwise direction by virtue of contact area 178 engaging wall 168 when the sealing disc is moved upwardly along the longitudinal axis 174, i.e., valve opening direction. In other words, the contact areas 178, 180 are arranged symmetrically on opposite sides of the longitudinal axis 176 and transverse axis of the drive hub 128. The degree of rotation of the sealing disc 162 is dependent upon the extent of offset between the contact areas 178, 180 and the linear axis 174, i.e., arc $\theta_3$. This can be accomplished by increasing or decreasing the width of endwalls 136, 138. In this manner, the extent of rotation of the sealing discs 162 may be controlled to variable degrees as may be desired.

Figure 5:
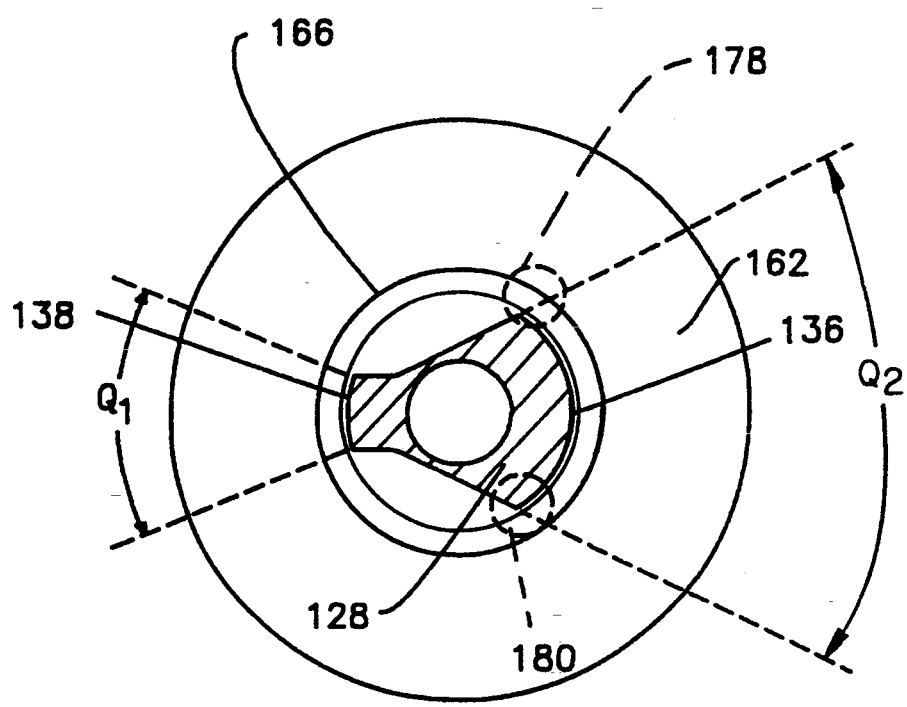
FIG. 5 is a top plan view of a sealing disc having a horn-shaped drive hub of the disc drive assembly in accordance with another embodiment of the present invention.

The operation of the rotating disc valve 100 has thus far been described as providing counterclockwise rotation of the discs 162 when either opening or closing the valve. In accordance with the embodiment shown in FIG. 5, the sealing disc 162 is adapted for alternate rotation in a clockwise and counterclockwise direction as the drive hub 128 is reciprocated between valve opening and closing directions. In this regard, the disc drive 128 is provided in the general shape of a horn with endwalls 136, 138 extending over non-equal arcs, wherein $\theta_1$ is not equal to $\theta_2$. As such, the sealing disc 162 will rotate counterclockwise in a valve closing direction and clockwise in a valve opening direction resulting from the non-symmetrical arrangement of the contact areas 178, 180 which are now located along the same endwall 136.

Figure 6:
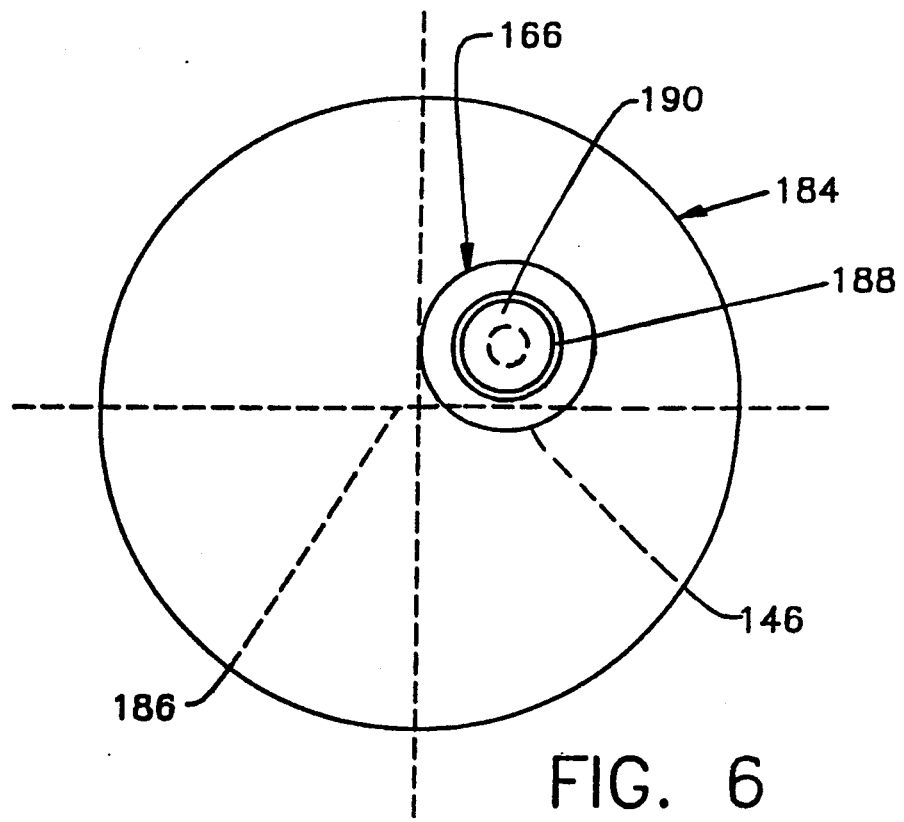
FIG. 6 is a top plan view of a sealing disc having an eccentrically arranged bearing for receiving the drive hub of the disc drive assembly in accordance with another embodiment of the present invention.

Referring now to FIG. 6, there is shown a sealing disc 184 constructed in accordance with another embodiment of the present invention. In accordance with this embodiment, the bearing 166 is arranged at a location eccentric from the center rotational axis 186 of the disc 184. This enables the use of drive hub 188 which is constructed from a uniform cylindrical body 190 as opposed to the generally parallelogram shape of the drive hub 128 as shown and described with respect to the preferred embodiment of FIG. 2. This eccentric arrangement of the bearing 166 will affect rotation of the disc 184 during reciprocal movement of the drive hub 188 during operation of the rotating disc valve 100. It will be appreciated that the greater the degree of eccentricity of the bearing 166 with respect to the rotational axis 186 of the sealing disc 184, the greater the degree of rotation.

Figure 7:
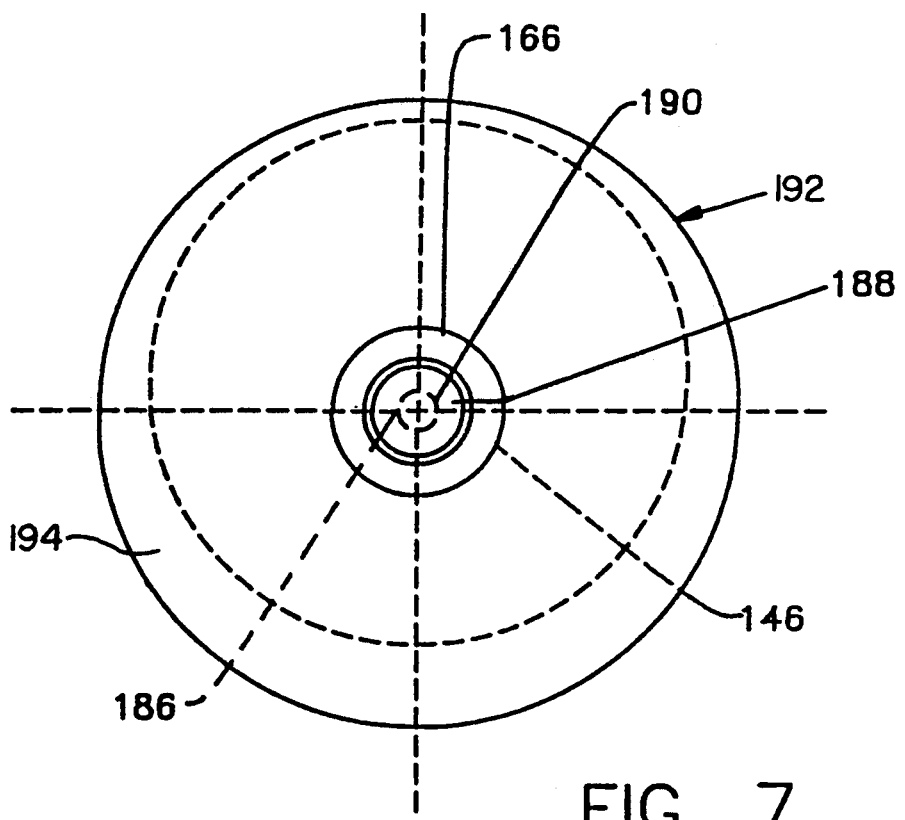
FIG. 7 is a top plan view of a sealing disc having an eccentrically arranged sealing surface constructed in accordance with another embodiment of the present invention.

Referring now to FIG. 7, there is shown the construction of a sealing disc 192 in accordance with another embodiment of the present invention. In accordance with this arrangement, the bearing 166 is arranged coincident with the center rotational axis 186 of the disc 192. As in the previous embodiment, the drive hub 128 is once again constructed as a cylindrical body 190. In order to attain the unbalanced forces to affect disc rotation, the sealing disc 192 is provided with an eccentrically arranged slightly raised sealing area 194. Based on this arrangement, it will be appreciated that the centroid of the raised sealing area 194 will be eccentric to the center rotational axis 186 of the sealing disc 192. The unbalanced frictional forces on the sealing area 194 during reciprocal movement will cause the disc 192 to rotate. It should be appreciated that the greater the eccentricity of the centroid of the sealing area 194 the greater the extent of rotation of the disc 192.

Figure 8:
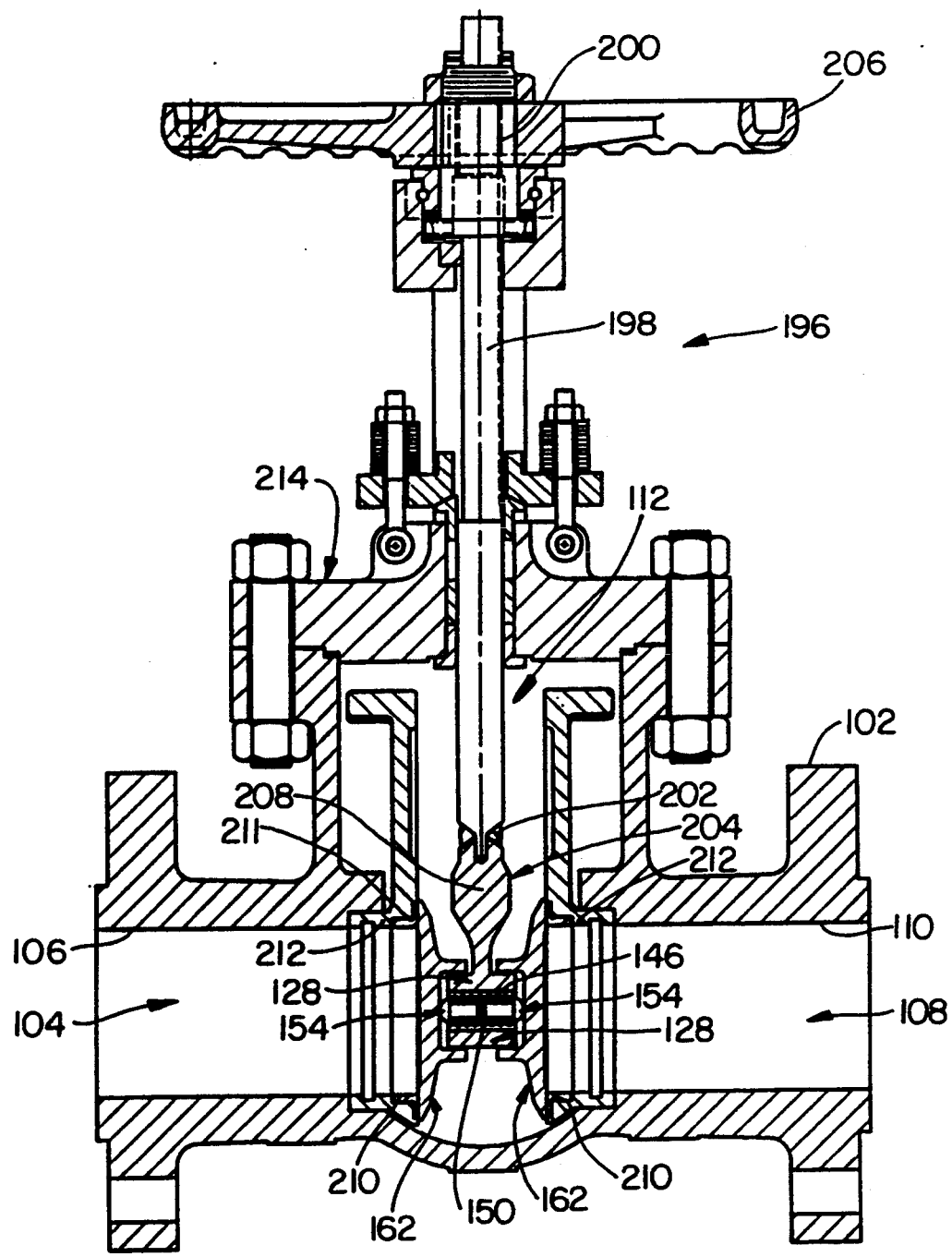
FIG. 8 is a partial cross-sectional view of a linearly actuated rotating disc valve constructed in accordance with another embodiment of the present invention and adapted for operation using a manually rotatable valve handle.
Figure 1:
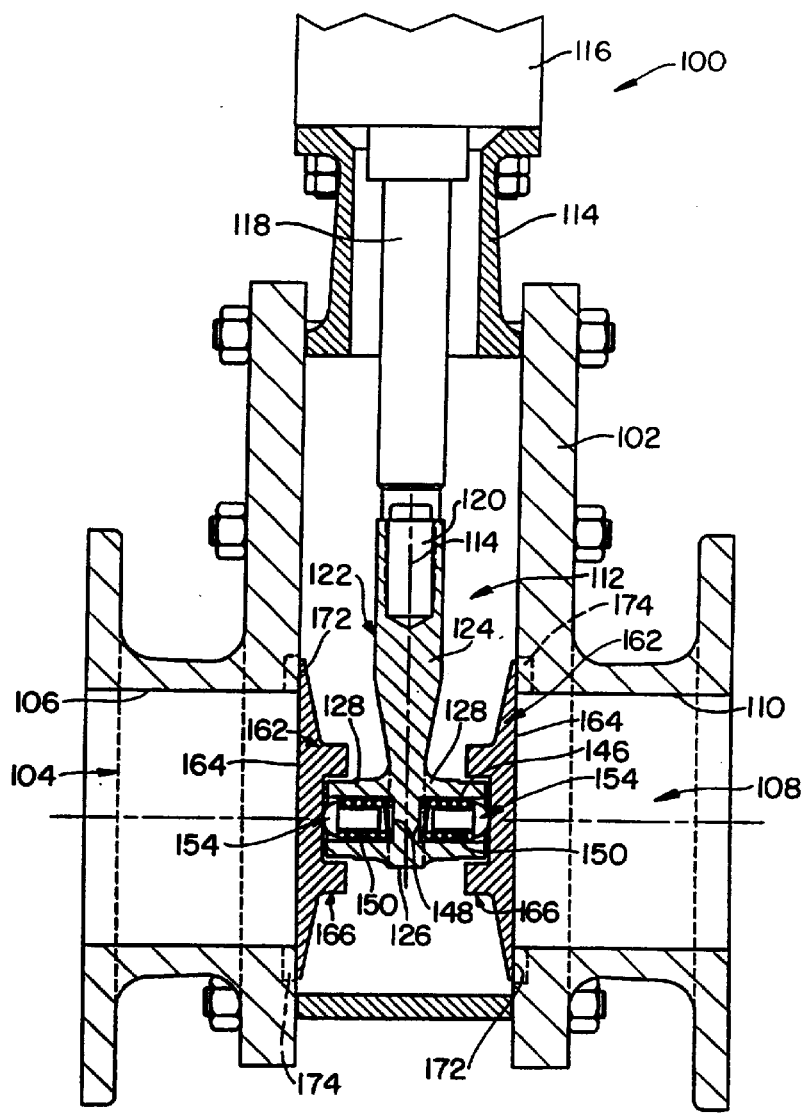
Figure 2:
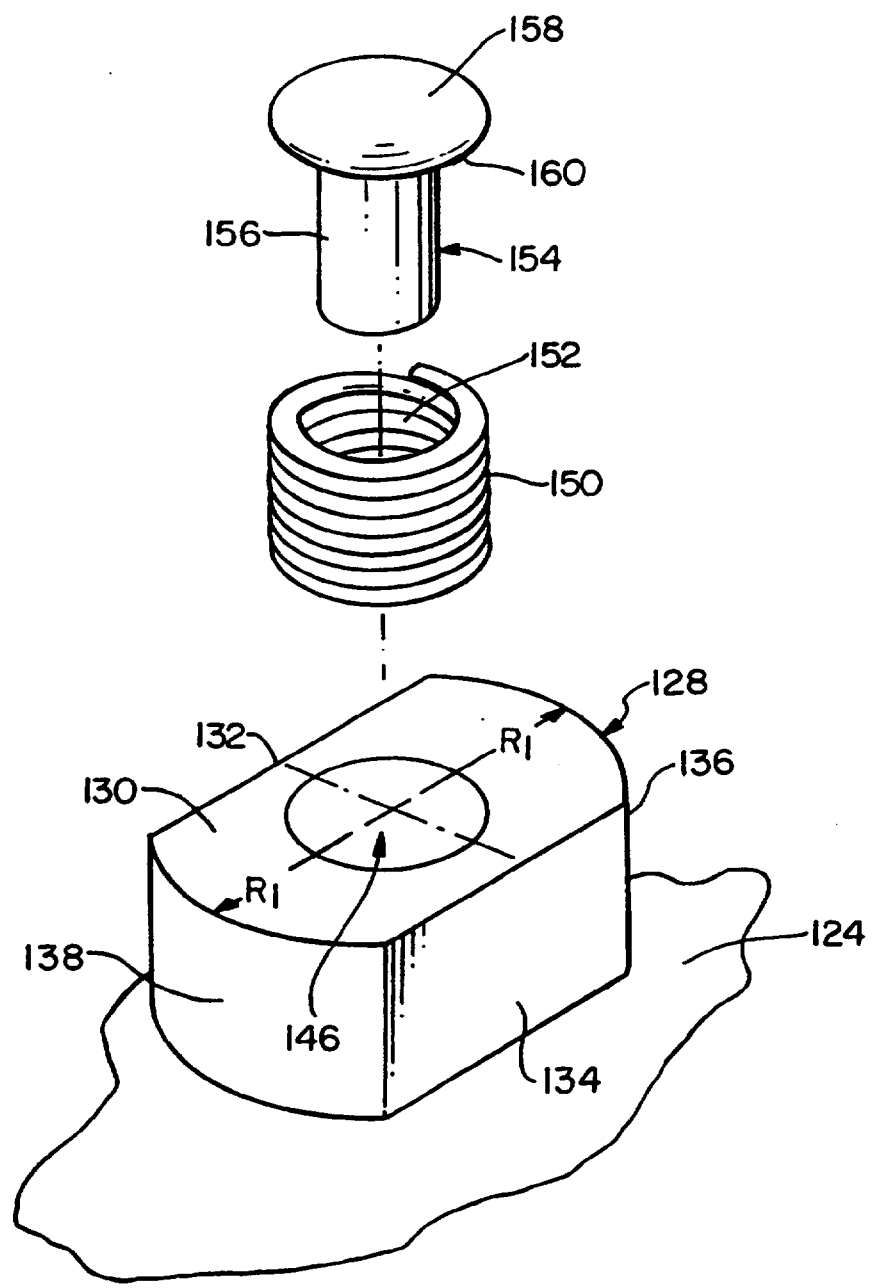

Referring now to FIG. 8, there will be described the construction and operation of a manually operated rotating disc valve 196 in accordance with another embodiment of the present invention. Once again, it is to be understood that like reference numerals represent like elements, and therefore, only the essential differences in construction of the rotating disc valve 196 over the rotating disc valve 100 as shown in FIG. 1 will be described. In particular, a longitudinally extending valve stem 198 having an externally threaded proximal end 200 and a distal end 202 welded to a disc drive assembly 204 is arranged longitudinally bisecting cavity 112. The stem 198 is caused to be rotated about its longitudinal axis in a conventional manner by means of handle 206 which threadably engages the threaded proximal end 200. The disc drive assembly 204 is constructed from a shaft 208 supporting adjacent its distal end a pair of opposed drive hubs 128. The drive hubs 128 differ from those described with respect to FIG. 2 in that the center bore 146 extends entirely therethrough without an endwall 148. In this regard, each of the drive hubs 128 are constructed from a projecting body 130 generally in the form of a parallelogram as described with respect to the preferred embodiment, or a uniform cylindrical body as described with respect to the embodiments of FIGS. 6 and 7.

In view of the omission of the endwall 148, a single compression spring 150 is received within the bore 146 so as to receive a bearing pin 154 extending outwardly within either end thereof. Each of the drive hubs 128 rotationally support thereabout a sealing disc 162 whose construction is as previously described with respect to any one of the embodiments of the present invention. The sealing surfaces 164 of the sealing discs 162 compressively engage an annular valve seat 210 which is constructed as an insert retained within an annular notch 211 in a removable seat plate 212. This arrangement enables replacement of the valve seats 210, if desired, by disassembling a portion of the housing 102, for example, by removal of valve stem packing assembly 214 which provides access to the removable seat plate 212. The rotation of the sealing discs 162 are effected by reciprocal movement of the valve stem 198 by means of rotation of handle 206 in the same manner as previously described with respect to the rotating disc valve 100 as shown in FIG. 1.

The components of the rotating disc valve 196 can be constructed from a variety of materials. For example, the housing 102 can be constructed from cast iron or carbon steel, while the valve stem 198 can be constructed from 416 stainless steel. The valve seats 210 can be constructed from welded overlay Stellite #6 or thermally sprayed therewith. In this regard, the sealing discs 162 will also be constructed from Stellite #6. In the alternative, it is contemplated that the valve seats 210 can be constructed from nickel/chrome carbide material, whereupon it is preferred that the sealing discs 162 be constructed from stainless steel 440 C. In any event, it is to be appreciated that the construction of the rotating disc valves 100, 196 are not limited to these disclosed materials, and other such materials may be used in practicing the present invention.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A valve comprising a housing having an opening for the flow of material therethrough, drive means within said housing for movement relative to said opening along an axis between open and closed positions, sealing means for closing said opening when said drive means is in said closed position, mounting means for rotatably mounting said sealing means to a portion of said drive means, said portion of said drive means engaging said mounting means during linear movement thereof between said open and closed positions at a location offset from said axis thereby rotating said sealing means during said movement.

2. The valve of claim 1, wherein said drive means comprises a generally parallelogram shaped body.

3. The valve of claim 2, wherein said body includes endwalls of substantially equal size.

4. The valve of claim 2, wherein said body includes endwalls of substantially unequal size.

5. The valve of claim 1, wherein said mounting means includes a bearing on said sealing means having a bore for rotationally receiving said drive means.

6. The valve of claim 1, wherein said axis comprises a linear axis.

7. The valve of claim 1, wherein said drive means engages said location when moved in a first direction and another location when moved in a second direction opposite to said first direction.

8. The valve of claim 7, wherein said drive means includes a longitudinal axis and a transverse axis, and wherein said locations are symmetrical arranged on opposite sides of said longitudinal and transverse axes of said drive means.

9. A valve comprising a housing having an opening for the flow of material therethrough, a disc drive within said housing reciprocal relative to said opening along a linear axis between open and closed positions, a sealing disc for closing said opening upon contact with a portion of said housing surrounding said opening when said disc drive is in said closed position, mounting means for mounting said sealing disc to a portion of said disc drive, said portion of said drive engaging said mounting means during reciprocal linear movement thereof between said open and closed positions at a location offset from said linear axis, whereby said sealing disc rotates during said reciprocal linear movement thereof by said disc drive.

10. The valve of claim 1, wherein said portion of said drive means engaging said mounting means creating an unbalanced force causing rotation of said sealing means.

11. The valve of claim 9, wherein said disc drive comprises a generally parallelogram shaped body.

12. The valve of claim 11, wherein said body includes endwalls of substantially equal size.

13. The valve of claim 11, wherein said body includes endwalls of substantially unequal size.

14. The valve of claim 9, wherein said mounting means includes a bearing on said sealing disc having a bore for rotationally receiving said disc drive.

15. The valve of claim 9, wherein said disc drive engages said location when moved in a first direction and another location when moved in a second direction opposite to said first direction.

16. The valve of claim 15, wherein said disc drive includes a longitudinal axis and a transverse axis, and wherein said locations are symmetrical arranged on opposite sides of said longitudinal and transverse axes of said disc drive.

17. The valve of claim 15, wherein said disc drive includes a body having opposed endwalls providing said locations for engaging said sealing disc.

18. The valve of claim 17, wherein said locations are arranged on opposite endwalls.

19. The valve of claim 17, wherein said locations are arranged spaced apart on the same endwall.

20. A valve comprising a housing having an opening surrounded by a sealing seat for the flow of material therethrough, a disc drive within said housing reciprocal relative to said opening along a linear axis between open and closed positions, said disc drive comprising a generally parallelogram shaped body, a sealing disc having a sealing surface on one side thereof for sealing engagement with said sealing seat and a bearing extending from another side thereof for rotationally receiving therein said body of said disc drive, said body engaging said sealing disc at a first location when moved in a first direction and at a second location when moved in a second direction opposite said first direction, said first and second locations being offset from said linear axis whereby said sealing disc rotates during reciprocal linear movement thereof by said disc drive.

21. A valve comprising a housing having an opening for the flow of material therethrough, drive means within said housing for movement relative to said opening along a linear axis between open and closed positions, sealing means having a center axis for closing said opening when said drive means is in said closed position, mounting means at an eccentric location relative to said center axis for rotatably mounting said sealing means to a portion of said drive means, said portion of said drive means engaging said mounting means during linear movement thereof between said open and closed positions at said eccentric location to said center axis of said sealing means thereby rotating said sealing means.

22. The valve of claim 21, wherein said linear axis coincides with said center axis of sealing means.

23. A valve comprising a housing having an opening for the flow of material therethrough, drive means within said housing for movement relating to said opening along an axis between open and closed positions, sealing means having a rotational axis for closing said opening when said drive means is in said closed position, mounting means for rotatably mounting said sealing means to a portion of said drive means, said sealing means having a sealing area whose centroid is eccentric to the rotation axis of said sealing means, said sealing area engaging a portion of said housing surrounding said opening for precluding flow of material therethrough, whereby rotation of said sealing means is effected by the creation of unbalanced frictional forces resulting from the engagement of said sealing area with said portion of said housing surrounding said opening during linear movement thereof by said drive means.

24. The valve of claim 23, wherein said axis comprises a linear axis.

* * * * *

UNITED STATES PATENT AND TRADEMARK OFFICE
CERTIFICATE OF CORRECTION

PATENT NO.     : 5,396,919
DATED          : March 14, 1995
INVENTOR(S)    : Wilson It is certified that error appears in the above-identified patent and that said Letters Patent is hereby corrected as shown below:

Drawings,
Between Sheet 2 of 5 and Sheet 3 of 5, insert FIGS. 3 and 4 (attached).

Signed and Sealed this

Twenty-fourth Day of June, 2003

JAMES E. ROGAN
*Director of the United States Patent and Trademark Office*

United States Patent [19]

Wilson

[11] Patent Number: 5,396,919
[45] Date of Patent: Mar. 14, 1995

[54] ROTATING DISC VALVE

[75] Inventor: James T. Wilson, Summit, N.J.

[73] Assignee: Everlasting Valve Co., Inc., South Plainfield, N.J.

[21] Appl. No.: 108,921

[22] Filed: Aug. 18, 1993

[51] Int. Cl.⁶ .............................................. F16K 29/00
[52] U.S. Cl. .................................. 137/330; 251/327; 251/328
[58] Field of Search ...................... 137/243, 243.2, 330; 51/241 A, 241 VS; 251/193, 195, 203, 326, 327, 328

[56] References Cited

U.S. PATENT DOCUMENTS

| | | | |
|---|---|---|---|
| 2,443,929 | 6/1948 | Patterson | 137/243.2 |
| 2,964,291 | 12/1960 | Williams et al. | 251/327 |
| 3,047,266 | 8/1962 | Ver Nooy | 251/175 |
| 3,305,208 | 2/1967 | Bredtschneider | 251/327 |
| 3,318,568 | 5/1967 | Blomstran | 251/259 |
| 3,400,441 | 9/1968 | Fryling | 251/327 |
| 3,478,771 | 11/1969 | Johnson | 251/327 |
| 3,506,238 | 4/1970 | Bertels | 251/193 |
| 3,837,356 | 9/1974 | Selep et al. | 137/375 |
| 4,174,728 | 11/1979 | Usnick et al. | 137/240 |
| 4,187,876 | 2/1980 | Lang | 137/594 |
| 4,221,307 | 9/1980 | Peterson | 251/327 |
| 4,335,733 | 6/1982 | Richards | 137/1 |
| 4,367,766 | 1/1983 | Uomala | 137/243 |
| 4,373,546 | 2/1983 | Krakovsky | 137/330 |
| 4,381,100 | 4/1983 | Schoenberg | 251/175 |
| 4,383,546 | 5/1983 | Walters, Jr. | 137/240 |
| 4,412,671 | 11/1983 | Tiefenthaler | 251/31 |
| 4,429,710 | 2/1984 | Grieves et al. | 137/375 |
| 4,449,547 | 5/1984 | Krakovsky | 137/330 |
| 4,509,549 | 4/1985 | Cooper et al. | 137/327 |
| 4,585,023 | 4/1986 | Almada | 137/240 |
| 4,787,417 | 11/1988 | Windsor, Jr. | 137/624.13 |
| 4,881,717 | 11/1989 | Geiser | 251/144 |
| 4,949,939 | 8/1990 | Almada | 251/328 |
| 5,024,416 | 6/1991 | Cohen | 251/78 |

OTHER PUBLICATIONS

Everlasting Rotating Disc Valves, 4 page sales brochure.
"An 86 Year Old Workaholic"2 page sales brochure.

Primary Examiner—George L. Walton
Attorney, Agent, or Firm—Lerner, David, Littenberg, Krumholz & Mentlik

[57] ABSTRACT

A disc valve is linearly actuated to effect rotation of its sealing disc during opening and closing operations. Disc rotation is effected by creating unbalanced frictional forces between the sealing surfaces during valve operation. Rotation of the disc produces a lapping action that in the process medium renews and polishes the metal seating surfaces with each operation.

24 Claims, 5 Drawing Sheets

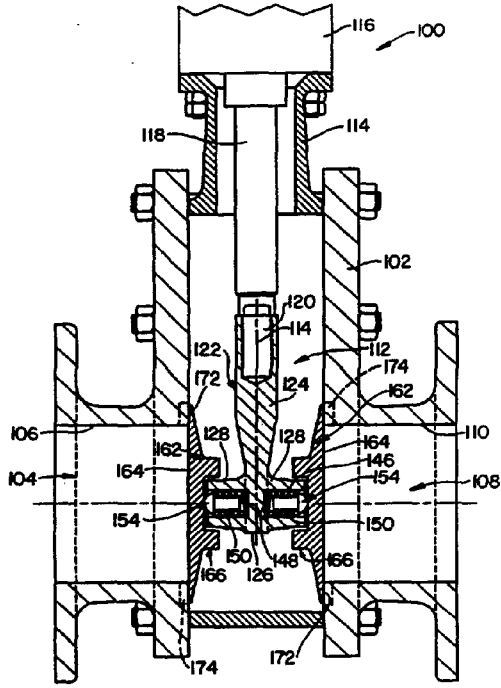

UNITED STATES PATENT AND TRADEMARK OFFICE
CERTIFICATE OF CORRECTION

PATENT NO.     : 5,396,919
DATED          : March 14, 1995
INVENTOR(S)    : Wilson It is certified that error appears in the above-identified patent and that said Letters Patent is hereby corrected as shown below:

The drawing sheets consisting of Figs. 1,2,5,6,7 and 8, should be deleted to be replaced with the drawing sheets consisting of Figs. 1 - 8 as shown on the attached pages.

Signed and Sealed this

First Day of July, 2003

JAMES E. ROGAN
*Director of the United States Patent and Trademark Office*